UNITED STATES PATENT OFFICE.

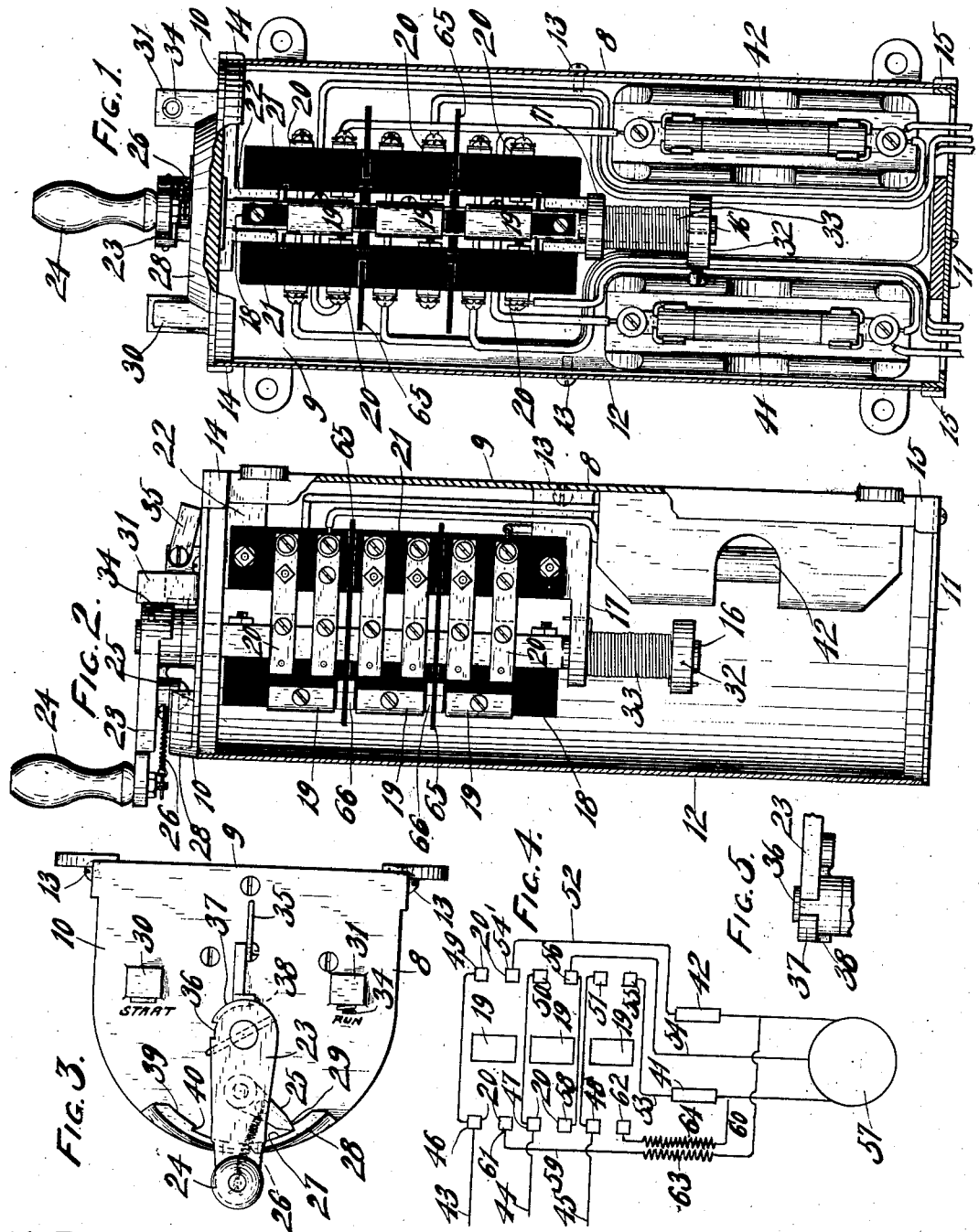

THOMAS S. WATSON, CHARLES A. RHINE, AND CHARLES H. KEENEY, OF MILWAUKEE, WISCONSIN, ASSIGNORS TO UNION ELECTRIC MANUFACTURING COMPANY, OF MILWAUKEE, WISCONSIN, A COPARTNERSHIP COMPRISING JOHN RHINE, CHARLES A. RHINE, AND CHARLES H. KEENEY.

SWITCH.

1,059,416.  Specification of Letters Patent.  Patented Apr. 22, 1913.

Application filed January 13, 1911. Serial No. 602,517.

*To all whom it may concern:*

Be it known that we, THOMAS S. WATSON, CHARLES A. RHINE, and CHARLES H. KEENEY, citizens of the United States, residing in Milwaukee, in the county of Milwaukee and State of Wisconsin, have invented new and useful Improvements in Switches, of which the following is a description, reference being had to the accompanying drawings, which are a part of this specification.

This invention relates to improvements in switches and more particularly to that type of switch used in starting electric motors.

One of the objects of this invention is to provide a switch which is adapted for use in connection with direct and alternating current motors, or as a reversing switch or which may be used in connection with any device which is adapted to be controlled by a switch having a starting position, a running position and an intermediate or "off" position.

A further object of the invention is to provide a switch which is adapted to prevent the "blowing" of fuses in starting electric motors.

A further object of this invention is to provide a switch having a starting position, a running position and an intermediate or "off" position and the switch handle being so constructed that the operating handle must be moved from the "off" position to the starting position before it can be moved to the running position.

A further object of the invention is to provide a switch so constructed that the handle may be arranged to be moved back and forth from the "off" position to the starting position and back to the "off" position without being moved to the running position and when so moved the handle cannot be moved to the running position until it has again been moved to the starting position.

A further object of the invention is to provide a switch with an operating handle which will automatically swing from the starting position to the running position when the handle has been moved from the "off" position to the starting position.

A further object of the invention is to provide a switch which is adapted to insert resistance in the circuit when the handle is moved to the starting position and to cut out said resistance when the handle has been moved to the running position.

A further object of the invention is to provide a switch which is simple in construction and operation and is inexpensive to manufacture and maintain.

With the above, and other objects in view, the invention consists of the switch and its parts and combinations as set forth in the claims, and all equivalents thereof.

In the accompanying drawing in which the same reference characters indicate the same parts in all of the views, Figure 1 is a front view of the improved switch, parts of the casing being broken away and other parts shown in section; Fig. 2 is a side view thereof, parts also being broken away and other parts shown in section; Fig. 3 is a top view of the switch; Fig. 4 is a diagram of one of the electric circuits adapted for use in connection with the switch; and Fig. 5 is a fragmentary detail view of the operating lever.

Referring to the drawing the numeral 8 indicates the casing or support which in this exemplification of the invention is in the form of a drum having a back portion 9, a top plate 10, a bottom plate 11 and a removable semicircular front cover 12 which is connected to the back portion by screws 13. The upper and lower side edges of the front cover are held in position by lugs 14 depending from the top plate and lugs 15 upstanding from the bottom plate. A switch shaft 16 having its upper end mounted in and extending through the top plate and its lower end mounted in and extending through a bearing arm 17 projecting forwardly from the back portion 9 carries an insulating contact shoe block 18 to which is connected contact shoes 19. These contact shoes which extend over the outer edge of the insulating block and are curved concentrically with relation to the axis of the shaft are each of sufficient length, vertically, to contact with two of the contact fingers 20 of the series of contact fingers positioned on each side of the shaft when said shaft is turned to move the shoes into contact with either series thereof. The fingers are connected to and insulated from the casing by insulating finger blocks 21 which are bolted to the bearing arm 17 and to a supporting arm 22 projecting from the back portion 9. The contact portion of these fingers are positioned diametrically opposite each other with relation to the shaft so that when said shaft is turned a quarter turn to the right or to the left the contact shoes carried by said shaft will contact with one of the series of contact fingers and complete an electric circuit.

A switch operating lever 23 rigidly connected to the upper projecting end of the shaft is adapted to control the movement of the switch shaft. The lever is provided with a handle 24 for convenience in operating the same. A pawl 25 pivotally connected to the lower side of the lever and having a spring connection 26 with said lever is positioned so that its free end will ride along the inner curved face 27 of the segmental projection 28 extending upwardly from the top plate 10. The segmental projection is curved concentrically with relation to the axis of the shaft in order to cause the pawl to ride freely on the projection without binding. When the switch lever is in the "off" or intermediate position the free end of the pawl is positioned to be swung at an angle to one side of the lever and to engage the stop shoulder 29 formed on the inner curved face of the segmental projection to prevent said lever from being moved to the right or the running position before it has been moved to the left or the starting position. The segmental projection is of sufficient length to require the lever to be swung against the starting position stop post 30 or against the running position stop post 31 before the end of the pawl 25 will become disengaged from the end of the segmental projection and permit said lever to be swung to the other position. The stop posts are so positioned with relation to the contact fingers that when the lever is bearing against either post the contact shoes will be in full contact with the series of contact fingers on the same side of the case as the particular post is located which is engaged.

The lower projecting end of the shaft carries a collar 32 adjustably fastened thereto by a set screw and a coiled spring 33 surrounding the shaft and interposed between the collar and the bearing 17 and connected to both the bearing and the collar is adapted to automatically swing the shaft and connected parts to the full running position when the pawl is disengaged from the stop shoulder by swinging the lever to the starting position. The running position stop post 31 is provided with a bumper in the form of a coiled spring 34 to cushion the blow when the handle is automatically swung from the starting position to the running position.

At times, and especially while installing the switch, it is desirable to permit the switch to be swung to starting position and back again to the "off" position without being compelled to swing the lever to the running position and to accomplish this result a latch 35 pivotally connected to the top plate is provided which is adapted to be swung through the recess 36 and beneath the annular flange 37 formed on the hub portion of the lever. This flange terminates in a shoulder 38 which is engaged by the free end of the latch 35 to hold the lever in the intermediate or "off" position after it has been swung to the starting position. The recess 36 is so positioned with relation to the lever that the latch 35 can only be swung beneath the annular flange when the lever is in the starting position and in order to swing the lever to the running position it will be necessary to first swing it to the starting position to turn the latch out of engagement therewith before it will automatically swing to the running position.

When the latch is in engagement with the shoulder 38 of the lever the free end of the pawl 25 will rest on the thickened portion 39 of the segmental projection 28, the said thickened portion being of sufficient length to prevent the pawl from engaging the shoulder 40 formed thereon.

The numerals 41 and 42 indicate the circuit interrupters which are shown as ordinary fuses but which may be in the form of circuit breakers or other safety devices.

Referring now particularly to the circuit diagram the numerals 43, 44 and 45 indicate the lead wires which extend to the contact fingers 46, 47 and 48 respectively on one side of the case and to the fingers 49, 50 and 51 respectively on the other side of the case. Wires 52, 53 and 54 extend from contact fingers 54', 55 and 56 to the alternating current motor 57, and the wire 54 is also connected to the contact finger 58 on the opposite side of the casing. The wires 52 and 53 are provided with the fuses 41 and 42 before mentioned. Wires 59 and 60 connected to the contact fingers 61 and 62 and to the wires 52 and 53 respectively below the fuses are provided with resistance units 63 and 64. This resistance may be omitted if desired when the switch is used in connection with motors of small size.

Insulating guards 65 serve to prevent arcing between the contact fingers when breaking the circuit and the insulating block carried by the shaft is grooved as indicated by the numeral 66 to permit said guards to extend between the contact shoes.

In operation and with the handle of the switch in the position as shown in the drawing, the lever is prevented from being swung to the running position by the engagement of the pawl with the stop shoulder of the segmental projection and it can only be swung to the starting position. While in this position the contact shoes will bridge the fingers in pairs and complete the circuit to the motor with the fuses cut out of the circuit. The lever is held in this position for a short period of time and is then released and the spring will automatically swing the lever to the running position with the contact shoes bridging the contact fingers in pairs on the running side of the case and with the fuses in the circuit. When the lever has been swung to the starting position the pawl will have snapped off of the end of the segmental projection and permit the lever to swing to the running position and when the lever is in the running position the pawl will have snapped off of the opposite end of the segmental projection to permit the lever to be swung to the intermediate or "off" position.

When it is desired to stop the motor the lever is swung to the "off" position and the pawl will engage the stop shoulder of the segmental projections and hold the lever in the intermediate position.

In installing the switch, or at other times when desired, the latch provides a means for starting and stopping the motor without swinging the lever to the full running position.

While the switch is shown and described in connection with an alternating current motor it is to be understood that the switch is also adapted for use in connection with direct current motors and may also be used to control other devices. When used in controlling some devices the coiled spring for swinging the handle to the running position may be omitted and when so arranged the operator will be compelled to swing the handle in the opposite direction from the position last used.

It is to be understood that this invention is not limited to any specific form or arrangement of parts except in so far as such limitations are specified in the claims.

What we claim as our invention is:

1. A switch, comprising a support, a switch member having a starting position and a running position and an intermediate position, a means having a constant tendency for automatically moving the member to its running position, and means coöperating with the member for holding said member in the intermediate position and preventing said member from being moved to its normal running position before it has been moved to the other operative position regardless of the speed of movement of the contact moving member.

2. A switch, comprising a support provided with a projection, a switch member having two operative positions and an intermediate position, a pawl carried by the switch member and positioned to engage the projection to prevent the switch member from being moved to one of the operative positions before it has been moved to the other operative position regardless of the speed of movement of the switch member, and a means for automatically moving the member to one of the operative positions.

3. In combination with an electric circuit including two paths and having a circuit interrupter in one of the paths, of a switch member included in said circuit and having a starting position and a running position and an intermediate position, the starting and running positions controlling the two paths of the circuit, a means having a constant tendency for automatically moving the switch member to the running position controlling the circuit interrupter path of the circuit, and means for preventing the movement of the switch member to the interrupter circuit path before it has been moved to the other operative position controlling the path of the circuit not provided with a circuit interrupter regardless of the speed of movement of the switch member.

4. In combination with an electric circuit including two paths and having a circuit interrupter in one of the paths, of a switch member included in said circuit and having a starting position and a running position and an intermediate position, the starting and running positions controlling the two paths of the circuit, a fixed projection on the support, and a means carried by the switch member and coöperating with the projection to prevent the switch member from being moved to the operative position controlling the interrupter circuit path before it has been moved to the other operative position regardless of the speed of movement of the contact moving member.

5. In combination with an electric circuit including two paths and having a circuit interrupter in one of the paths, of a switch member included in said circuit and having two operative positions and an intermediate position, the operative positions controlling the two paths of the circuit, a projection on the support, and a pawl carried by the switch member and positioned to engage the projection to prevent the switch member from being moved to the operative position controlling the interrupter circuit path before it has been moved to the other operative position regardless of the speed of movement of the switch member.

6. A switch, comprising a support provided with a shouldered projection, a switch member having two operative positions and an intermediate position, a means for automatically moving the switch member to one of the operative positions, and means coöperating with the switch member and the shouldered projection for holding said switch member in the intermediate position and for preventing said switch member from being automatically moved to one operative position before it has been moved to the other operative position regardless of the speed of movement of the switch member.

7. A switch, comprising a support provided with a shouldered projection, a switch member having two operative positions and an intermediate position, a means for automatically moving the switch member to one of the operative positions, and a spring actuated means coöperating with the switch member and the shouldered projection for holding said switch member in the intermediate position and for preventing said switch member from being automatically moved to one operative position before it has been moved to the other operative position regardless of the speed of movement of the switch member.

8. A switch, comprising a support provided with a shouldered projection, a switch member having two operative positions and an intermediate position, a means for automatically moving the switch member to one of the operative positions, and a spring actuated pawl pivotally connected to the switch member and positioned to engage the projection and its shoulder to hold said switch member in the intermediate position and to also prevent said switch member from being automatically moved to one operative position before it has been moved to the other operative position regardless of the speed of movement of the switch member.

9. A switch, comprising a support provided with a shouldered curved projection, a switch member pivotally mounted on the support and having two operative positions and an intermediate position, a lever arm forming part of said switch member, a pawl pivoted to and carried by the lever arm and positioned to engage the shouldered projection to prevent the switch member from being moved to one of the operative positions before it has been moved to the other operative position regardless of the speed of movement of the switch member, and a spring for moving the switch arm to one of the operative positions.

10. In combination with an electric circuit including two paths and having a circuit interrupter in one of the paths and a resistance in the other path, of a switch member included in said circuit and having two operative positions and an intermediate position, the operative positions controlling the two paths of travel of the circuit, a fixed projection on the support, and a movable means carried by the switch member and coöperating with the projection to positively prevent the switch member from being moved to the operative position controlling the interrupter circuit path before it has been moved to the other operative position controlling the resistance path regardless of the speed of movement of the switch member.

11. A switch, comprising a support, a switch member having two operative positions and an intermediate position, a means for automatically moving the member to one of the operative positions, means coöperating with the member for holding said member in the intermediate position and preventing said member from being moved to its normal operative position before it has been moved to the other operative position, and a means positioned to be moved into engagement with the switch member to prevent said member from being moved to one of the operative positions after it has been moved to the other operative position.

12. A switch, comprising a support provided with a projection, a switch member pivotally mounted on the support and having two operative positions and an intermediate position, a lever arm forming part of said switch member and provided with a shouldered flange, a spring actuated pawl pivoted to and carried by the lever arm and positioned to engage the shouldered projection to prevent the switch member from being moved to one of the operative positions before it has been moved to the other operative position, a spring for automatically moving the switch arm to one of the operative positions, and a latch positioned to be moved into engagement with the shouldered flange of the lever arm when said lever arm is in one of the operating positions to prevent the switch member from being automatically moved to its operative position after it has been moved to the other operative position.

13. A switch, comprising a support provided with a shouldered curved projection, a switch shaft mounted on the support and provided with contact shoes insulated therefrom, contact fingers connected to and insulated from the support and positioned adjacent to two sides of the shaft, a lever arm connected to the shaft, and a means carried by the lever arm and engaging the shouldered curved projection for positively preventing the lever arm being turned to move the contact shoes into engagement with the contact fingers on one side of the shaft before said contact shoes have been moved into engagement with the contact fingers on the other side of the shaft regardless of the speed of movement of the lever arm.

14. A switch, comprising a support provided with a shouldered curved projection, a switch shaft mounted on the support and provided with contact shoes insulated therefrom, contact fingers connected to and insulated from the support and positioned adjacent to two sides of the shaft, a lever arm connected to the shaft, a spring actuated member carried by the lever arm and engaging the shouldered curved projection for preventing the lever arm being turned to move the contact shoes into engagement with the contact fingers on one side of the shaft before said contact shoes have been moved into engagement with the contact fingers on the other side of the shaft regardless of the speed of movement of the switch shaft, and a spring for automatically moving the contact shoes of the shaft into engagement with the fingers on one side of the shaft.

15. A switch, comprising a support provided with a shouldered curved projection, a switch shaft mounted on the support and provided with contact shoes insulated therefrom, contact fingers connected to and insulated from the support and positioned adjacent to two sides of the shaft and forming a starting position on one side and a running position on the other side of the shaft, a spring for automatically moving the contact shoes into engagement with the contact fingers of the running side of the switch, a lever arm connected to the shaft, and a spring actuated pawl carried by the lever arm and positioned to engage the shouldered curved projection for preventing the lever arm being turned to move the contact shoes into engagement with the contact fingers on the running side of the switch before said shoes have been moved into engagement with the contact fingers of the starting side of said switch regardless of the speed of movement of the switch shaft.

In testimony whereof, we affix our signatures, in presence of two witnesses.

THOMAS S. WATSON.
CHARLES A. RHINE.
CHARLES H. KEENEY.

Witnesses:
 LAURA A. KELLEY,
 KATHERINE HOLT.